(12) United States Patent
Knispel et al.

(10) Patent No.: US 12,011,627 B2
(45) Date of Patent: Jun. 18, 2024

(54) PIPE ARRANGEMENT CONSISTING OF A PIPE OR A PIPE JOINT

(71) Applicant: Minimax Viking Research & Development GmbH, Bad Oldesloe (DE)

(72) Inventors: Jan-Simon Knispel, Schneverdingen (DE); Thorsten Gieseke, Großhansdorf (DE); Hanjo Diederley, Timmendorfer Strand (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 775 days.

(21) Appl. No.: 16/632,300

(22) PCT Filed: Jul. 25, 2018

(86) PCT No.: PCT/EP2018/070233
§ 371 (c)(1),
(2) Date: Jan. 17, 2020

(87) PCT Pub. No.: WO2019/020719
PCT Pub. Date: Jan. 31, 2019

(65) Prior Publication Data
US 2020/0360749 A1  Nov. 19, 2020

(30) Foreign Application Priority Data

Jul. 25, 2017  (DE) .................. 10 2017 116 850.8

(51) Int. Cl.
*F16L 55/17*  (2006.01)
*A62C 35/68*  (2006.01)
*F16L 59/16*  (2006.01)

(52) U.S. Cl.
CPC .............. *A62C 35/68* (2013.01); *F16L 55/17* (2013.01); *F16L 59/168* (2013.01);
(Continued)

(58) Field of Classification Search
CPC .......... F16L 47/22; F16L 55/17; F16L 59/168
See application file for complete search history.

(56) References Cited

U.S. PATENT DOCUMENTS 1,165,313 A * 12/1915 Bower .................... A62C 37/12
169/39
2,027,962 A * 1/1936 Currie ...................... F16L 47/22
138/140

(Continued)

FOREIGN PATENT DOCUMENTS

CN      2221702 Y     3/1996
CN    200972037 Y    11/2007
(Continued)

OTHER PUBLICATIONS

International Search Report, International Application No. PCT/EP2018/070233 (published under U.S. Appl. No. 19/020,719) 6 pages (dated Nov. 22, 2018).

(Continued)

*Primary Examiner* — Zachary T Dragicevich
*Assistant Examiner* — James A Linford
(74) *Attorney, Agent, or Firm* — Perkins Coie LLP (57) ABSTRACT

The invention concerns a pipe arrangement comprising a protective device for protecting against environmental influences, the pipe arrangement comprising:
a) a pipe joint which includes at least two pipe ends (1, 2) which are fixed together by means of a mechanical joint (3) and in which the pipe ends (1, 2) and also the mechanical joint are closed with a deformable hollow body (4),
(Continued)

or
b) a pipe (1) with a pipe opening (14), for example a leak, through which a medium which is disposed within the pipe can escape, wherein the pipe (1) is enclosed by a deformable hollow body where the pipe opening (14) is and wherein the pipe (1) is covered by the hollow body (4) in a predetermined portion on both sides of the opening (14),
or
c) a pipe having a pipe opening on which a sprinkler of a sprinkler installation is mounted, wherein the pipe (1) and also the sprinkler outlet is enclosed by a deformable hollow body (4) where the sprinkler is fixed to the pipe so that the hollow body (4) surrounds both the pipe end (1) and also the sprinkler outlet and a part of the sprinkler,
or
d) a pipe of a pipe system, wherein the pipe (1) is formed from two pipe portions which are connected together in positively locking relationship, for example by a welding process, a soldering process, a gluing process or the like, and wherein in the region of the positively locking connection the pipe is enclosed or covered by a deformable hollow body,
or
e) a pipe of a pipe system, wherein the pipe is enclosed by a deformable hollow body and where the hollow body (4) encloses the pipe (1) the pipe is carried by a suspension (13) which preferably has a material different from the material of the pipe.

9 Claims, 8 Drawing Sheets

(52) U.S. Cl.
CPC ....... *F16L 2201/20* (2013.01); *F16L 2201/30* (2013.01); *F16L 2201/40* (2013.01)

(56) References Cited

U.S. PATENT DOCUMENTS

| | | | | |
|---|---|---|---|---|
| 3,320,355 A * | 5/1967 | Booker | | |
| 3,438,658 A * | 4/1969 | Stevens | ................ | F16L 25/065 285/404 |
| 3,472,538 A * | 10/1969 | Wilder | ................. | F16L 25/065 285/403 |
| 3,565,116 A * | 2/1971 | Gabin | .................... | F16L 33/24 285/80 |
| 4,046,406 A | 9/1977 | Press et al. | | |
| 4,141,576 A * | 2/1979 | Lupke | ................ | B29C 66/1122 285/903 |
| 4,576,403 A * | 3/1986 | Burkholder | ............. | F16L 25/08 29/256 |
| 4,650,228 A * | 3/1987 | McMills | .............. | H01R 9/0518 174/DIG. 8 |
| 5,165,735 A * | 11/1992 | Nardi | .................... | F16L 25/065 285/369 |
| 6,585,054 B1 * | 7/2003 | Thomas | .................. | B05B 1/265 169/59 |
| 10,883,643 B2 | 1/2021 | Blake et al. | | |
| 2013/0168958 A1 * | 7/2013 | Van Den Bergh | .. | F16L 13/0272 285/294.1 |
| 2013/0206927 A1 * | 8/2013 | Greenfield | ................ | F16L 3/20 248/58 |
| 2013/0233435 A1 * | 9/2013 | Henthorn | .............. | F16L 25/065 138/155 |
| 2017/0343149 A1 * | 11/2017 | Mamish | .................. | F16L 47/22 |

FOREIGN PATENT DOCUMENTS

| | | | |
|---|---|---|---|
| CN | 201412612 Y | 2/2010 | |
| CN | 202040471 U | 11/2011 | |
| CN | 202381914 U | 8/2012 | |
| CN | 204254157 U | 4/2015 | |
| CN | 105209808 | 12/2015 | |
| CN | 105423041 | 3/2016 | |
| CN | 205101781 U | 3/2016 | |
| CN | 205118569 U | 3/2016 | |
| CN | 205261019 U | 5/2016 | |
| CN | 205909882 U | 1/2017 | |
| CN | 106583954 | 4/2017 | |
| DE | 1475860 A1 * | 3/1969 | |
| DE | 8236832 | 7/1983 | |
| DE | 38 14 779 A1 | 11/1989 | |
| DE | 29818853 | 1/1999 | |
| DE | 10134512 | 1/2003 | |
| DE | 20116488 | 2/2003 | |
| DE | 10144277 | 3/2003 | |
| DE | 102008025085 | 12/2009 | |
| DE | 10 2014 100 155 A1 | 7/2015 | |
| EP | 0 748 934 A2 | 12/1996 | |
| EP | 2481966 A1 * | 8/2012 | ......... B29C 45/0025 |
| FR | 2 209 912 A1 | 7/1974 | |
| FR | 2 311 249 A1 | 12/1976 | |
| GB | 433917 A * | 8/1935 | |
| GB | 1 219 768 A | 1/1971 | |
| GB | 1 447 048 | 8/1976 | |
| GB | 201322697 | 2/2014 | |
| GB | 2 509 834 A | 7/2014 | |
| WO | WO 2008/086508 A2 | 7/2008 | |
| WO | WO 2012/009742 A1 | 1/2012 | |
| WO | WO-2016079451 A1 * | 5/2016 | ............ A61M 39/00 |

OTHER PUBLICATIONS

Raychem, TPS, Thermofit Tubular Pipe Sleeves with Thermal Indicator Installation Instructions, TPS-061/IP/5-01-01, 1 pp.
Screen captures from YouTube video clip entitled "Raychem's TPS Heat Shrinkable Tube Installation Procedure" 4 pages, uploaded on Apr. 30, 2013 by "JSICoatings". Retrieved from Internet: https://www.youtube.com/watch?v=rKP6dld4hQY.

* cited by examiner

PIPE ARRANGEMENT CONSISTING OF A PIPE OR A PIPE JOINT

PRIORITY CLAIM AND INCORPORATION BY REFERENCE

This application is a 35 U.S.C. § 371 application of International Application No. PCT/EP2018/070233, filed Jul. 25, 2018, which claims the benefit of German Application No. 10 2017 116 850.8 filed Jul. 25, 2017, each of which is incorporated by reference in its entirety.

TECHNICAL FIELD

The invention concerns a pipe arrangement, the arrangement comprising a pipe joint or an individual pipe. The pipe joint is to be interpreted as being a pipe which is formed from two pipe portions, wherein those pipe portions (pipe ends) are fixed together, for example, by means of a mechanical joint (for example, a sleeve or coupling) or are also connected together in positively locking relationship, for example by a welding process, a soldering process, a gluing process or the like.

BACKGROUND AND SUMMARY OF THE INVENTION

In particular the present invention concerns such a pipe arrangement which is used in a firefighting installation, for example a firefighting installation or firefighting apparatus, for example of the type of a sprinkler installation, a spray water installation, a dry extinguishing installation, an extinguishing installation, a hydrant installation, a gas extinguishing installation or the like.

In particular in that respect the invention concerns such firefighting installations comprising a pipe arrangement according to the invention which is arranged in production facilities, for example food production plants, canteens, kitchens, hospitals and so forth, that is to say in buildings and establishments in which, by virtue of hygiene requirements, cleaning of all the rooms in the building also has to be effected at recurring intervals and in that respect also the items of equipment of the firefighting installation, that is to say for example also the pipes, connections, T-pieces, pipe bends and the like repeatedly come into direct contact with cleaning agents.

The term pipe joint in the present application is used to denote a joint of at least two pipes with their respective pipe ends, which are so arranged relative to each other that a medium, whether a liquid, a gas or the like, can be received by the pipe and/or transported through the joined pipe and wherein the pipe joint on the one hand ensures that the joint is of a mechanically stable nature while on the other hand the pipe joint itself and thus the pipe at its joint itself is sealed and thus there is no possibility of escape of the medium in the pipe at the joint location.

Such pipe joints are to be found in different configurations. Thus it is known for two pipes to be mechanically joined by way of their pipe ends by means of sleeves, fittings or couplings, or also when the pipe ends have a thread, they can then be joined by means of a screw nut.

In that respect it is also known that the respective mechanical joint means like sleeves, couplings, fittings, screws and so forth are provided with seals, for example rubber rings, rubber lips or the like, to prevent the medium in the pipe from escaping at the joint location.

As a known system attention is directed for example to the system MINIMAX "PicoFix". In that known coupling the shaped pipe portions (pipe ends) have a peripherally extending groove. In that connection there are structures with rigid couplings, in which a tooth arrangement and a special inclined seat design for securely holding two half-shell portions (of metal) are disposed on the pipe ends to be joined and are well sealed off outwardly with a sealing ring by way of both pipe ends. There is also a flexibly grooved configuration which has the advantage of compensating for expansion and changes in length as the result of thermal effects.

In that case the seals used not only involve the function of preventing the medium in the pipe from escaping outwardly, but they also serve to provide that no particles, media (for example chemicals, air, water), environmental influences or the like pass from outside the pipe into the interior thereof.

The pipe ends of pipe portions are joined together by means of pipe joints so that individual pipe portions are used to form long pipes which are installed for example in firefighting installations, fire extinguishing installations, sprinkler installations, water lines and gas lines. In that respect the means for mechanically fixing/joining the pipe ends regularly constitute weak points at which dust, filth, moisture or the like (environmental residues) can be deposited, especially as the mechanical joint portions also usually form projections, undercut configurations and only partly closed spaces and so forth, at/in which dust, filth, media and so forth can be easily deposited. It is also not out of the question that the seals used age, degrade or lose their sealing function by virtue of the atmosphere (in particular due to oxygen in the air) itself or in connection with a reaction of the filth with the atmosphere or with water (for example spray water, cleaning agent and so forth) or with some medium which drops/is deposited on the pipe joint or comes into contact therewith, for example acid or the like.

Particularly when the pipework systems, pipe arrangements and thus the pipes, pipe ends and pipe joints have to maintain their function over a very long period of time, for example over a period of several years or decades, it can also happen moreover that the parts of the pipe joint itself were damaged by external atmospheres, whether air or water, or other external influences (these could also be aggressive atmospheres) like for example substances which come into contact with the pipe joint, including for example cleaning agents used for regular cleaning. The consequence of this can be that the pipe joints (and/or as mentioned the seal) themselves are damaged by corrosion or the like and thus the mechanically sound joint of the pipe ends can no longer be completely guaranteed, and also it is no longer possible to ensure the necessary sealing integrity.

In that respect it is known that, in the case of pipe joints, for example expensive stainless steel sleeves, stainless steel couplings or the like are used, and it is also already known to use expensive special steels, or also to provide the entire pipe joints with an expensive special paintwork.

The above-mentioned structures are however relatively elaborate and costly or the fitment thereof is very complicated, as is the case in particular with paintwork finishes, special coatings or the like.

The object of the present invention is to avoid the indicated disadvantages and to improve the pipe arrangement, to make it more reliable, in particular to better protect it from environmental influences, cleaning detergents and so forth and thus to ensure an improved service life and sealing integrity of the pipe arrangement, in particular the pipe joint.

According to the invention that object is attained by a pipe arrangement having the features set forth in one of the disclosed embodiments. Advantageous developments are recited in the appendant claims.

The subject-matter of the invention is thus a pipe arrangement comprising a protective device for protecting against environmental influences, the pipe arrangement comprising:

a) a pipe joint which includes at least two pipe ends (1, 2) which are fixed together by means of a mechanical joint (3) and in which the pipe ends (1, 2) and also the mechanical joint are closed with a deformable hollow body (4), or b) a pipe (1) with a pipe opening (14), for example a leak, through which a medium which is disposed within the pipe can escape, wherein the pipe (1) is enclosed by a deformable hollow body where the pipe opening (14) is and wherein the pipe (1) is covered by the hollow body (4) in a predetermined portion on both sides of the opening (14), or c) a pipe having a pipe opening on which a sprinkler of a sprinkler installation is mounted, wherein the pipe (1) and also the sprinkler outlet is enclosed by a deformable hollow body (4) where the sprinkler is fixed to the pipe so that the hollow body (4) surrounds both the pipe end (1) and also the sprinkler outlet and a part of the sprinkler, or d) a pipe of a pipe system of water extinguishing installations, for example sprinkler installations, spray water and extinguishing installations and hydrant installations, wherein the pipe is formed from two pipe portions which are connected together in positively locking relationship, for example by a welding process, a soldering process, a gluing process or the like, and wherein in the region of the positively locking connection the pipe is enclosed by a deformable hollow body, or e) a pipe of a pipe system of water extinguishing installations, for example sprinkler installations, spray water and extinguishing installations and hydrant installations, wherein the pipe is enclosed by a deformable hollow body and where the hollow body encloses the pipe the pipe is carried by a suspension which preferably has a material different from the material of the pipe.

In a first variant according to the invention a) a deformable hollow body is put over the pipe ends and the mechanical connecting means thereof, for example sleeves, fittings, coupling, screw or the like, which hollow body after deformation and thus assumption of its definitive deformation, encloses the pipe ends and the mechanical connecting means thereof snugly or in positively locking relationship and sealingly.

That has the advantage that in that way the entire pipe joint is securely closed off in relation to the outside world and thus the mechanical parts of the pipe joint and also the seal are securely protected from the atmosphere and external influences acting on the pipe joint.

In a preferred embodiment the hollow body is thermally deformable.

This may involve a design of a shrink tube or a hollow body which is produced from a subsequent wrapping with shrink properties and/or self-welding properties or a hollow body which is chemically deformable.

Because the deformable hollow body after its deformation snugly encloses the pipe joint the outside surface of the pipe joint has practically continuously only smooth surfaces on which dust, filth, media (for example water, chemicals and so forth) or the like can scarcely now be deposited in large amounts.

If nonetheless that happens then dust, filth or the corresponding deposit can also be removed by means of usual cleaning agents, for example also high pressure cleaners, without in that case the mechanical pipe joint or the pipe seal suffering damage because they are suitably protected by the enclosing hollow body.

In a further embodiment the hollow body can also contain in its interior an additional sealing material so that this provides for additional sealing as between the pipe and the hollow body and the ingress of media from the outside of the pipe joint or the pipe seal is further made difficult or impossible. The sealing material, for example adhesive, hot melt adhesive and so forth can also be applied to the hollow body material on the inside over its entire surface or part of its surface prior to application of the hollow body to the pipe ends or pipe joint.

Finally it is also possible that the deformable hollow body is subsequently fitted to an existing pipe joint, that is to say existing pipe joints can thus also acquire additional secure protection by retro-fitment.

Furthermore it is also possible that, when fitting the hollow body to the pipe joint, means for leakage monitoring are also fitted, that can be for example a moisture sensor which is then disposed between the deformed hollow body and the pipe joint and by which a signal is suitably produced in the event of moisture escape at the pipe joint and for example the signal can be transmitted to a receiving device so that in that respect maintenance of the pipe joint can be initiated.

Finally it is also possible for the hollow body to carry an active or passive moisture indicator which in the event of moisture escape at the pipe indicates that and can also be recognized by the maintenance personnel.

The invention is described hereinafter by means of embodiments by way of example.

Mode(s) for Carrying Out the Invention

Figure 1:
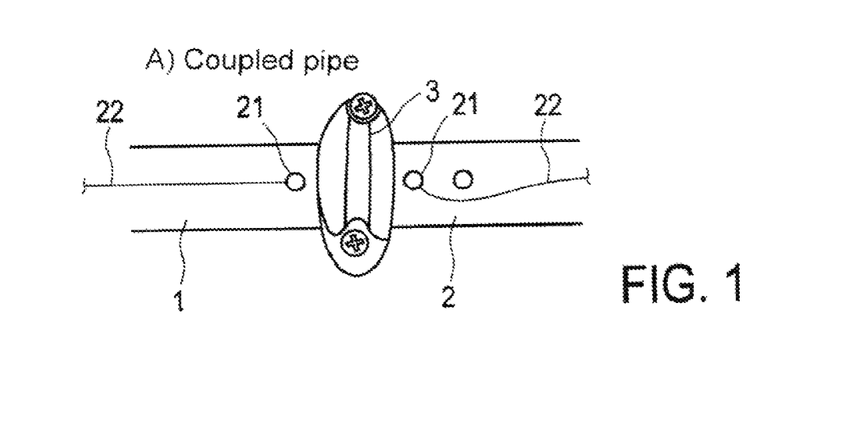
FIG. 1 shows a joint of an embodiment of the pipe arrangement for connecting two pipes or pipes ends.

FIG. 1 shows a joint for connecting two pipes or pipes ends 1 and 2, which in the illustrated example are fitted together in a butting relationship or disposed in opposite relationship in some other fashion. The two pipe ends are provided with a mechanical joint 3, which in the illustrated example is in the form of a coupling, in which respect any other mechanical joint can also be considered, for example, a sleeve, fittings, screw, or the like.

In this case the pipe coupling 3 substantially comprises two oppositely disposed half shell-shaped segments, for example of metal, plastic or the like, which are joined together, for example by means of screws, rivets or the like.

It can also be seen from FIG. 1 (view by way of example) that placed on one or both sides of the coupling is a moisture sensor 21 which has a cable connection 22. The moisture values measured with the moisture sensor 21 can be passed by way of the cable 22 to an evaluation means, for example a computer, data processor and so forth and processed there in order for example also to provide a corresponding moisture display at a display device.

Figure 2:
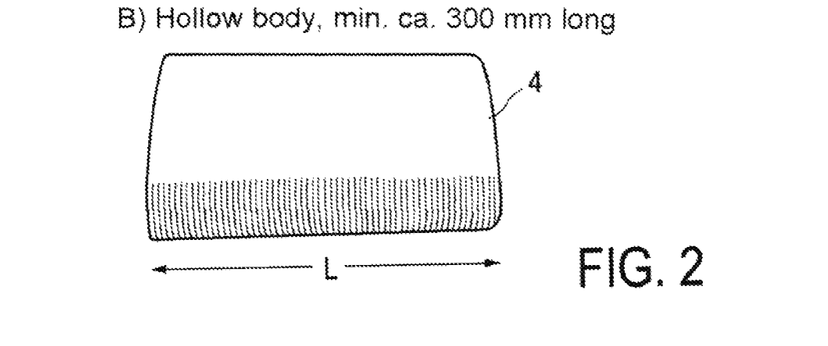
FIG. 2 shows a plan view of a deformable hollow body for an embodiment of the pipe arrangement.

In the plan view FIG. 2 shows the deformable hollow body 4, for example of a length L of about 30 cm. This kind of hollow body in the illustrated example involves a shrink tube 4.

Figure 3:
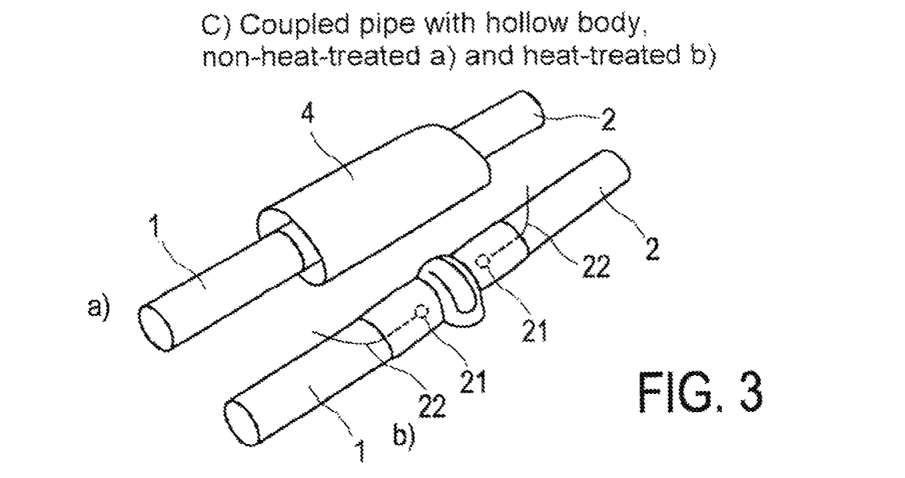
FIG. 3 shows the deformable hollow body over the joint of an embodiment of the pipe arrangement; (a) the hollow body is non-deformed and located over the joint, and (b) the hollow body is deformed and embraces the joint.

FIG. 3a shows how that shrink tube 4 which is as yet non-deformed is put over the pipe ends 1 and 2 and the mechanical joint of the two pipe ends and encloses or covers them.

FIG. 3b then shows, after deformation of the shrink tube 4, how it fits over the pipe ends 1 and 2 and the mechanical joint 3, tightly embraces it and thus bears snugly against it.

If the deformable hollow body 4 is a usual shrink tube then shrinkage is effected by thermal treatment, for example by blowing hot air on to the shrink tube 4 from the outside. As pipes in firefighting installations are usually of a relatively large diameter, that is to say for example a diameter of 1 inch or even more (even up to 12 inches diameter), preferably between 1 and 5 inches, in the thermal treatment care should be taken to ensure that the heat necessary for the shrinkage process acts as uniformly as possible on the shrink tube material from all sides in order thereby to permit a uniform shrinkage process over the entire radius of the shrink tube. Such a uniform shrinkage result can be ensured for example if, in the thermal treatment, the heat acts on the shrink tube simultaneously from all sides. That is possible for example by using a plurality of hot air devices which cause their hot air to act simultaneously on the shrink tube from various sides.

As can also be seen from FIG. 3b the pipe ends 1, 2 like also the mechanical joint 3, that is to say for example the pipe coupling, are now completely enclosed by the hollow body 4, that is to say the shrink tube, and that then forms a further barrier for the outside atmosphere in relation to the interior of the tube in which there can be for example a liquid or gaseous medium.

As can be seen from FIG. 3b the moisture sensors 21 are beneath the shrink tube, the cables 22 which are passed out of same are used, as mentioned, to pass the signals measured by the moisture sensor to the evaluation system.

Accordingly therefore the moisture sensor 21 can measure moisture occurring between the hollow body and the pipe because for example the shrink tube has become leaky by virtue of the action of cleaning detergents, treatment with high pressure cleaners and so forth. That can be appropriately displayed in order either to provide a fresh enclosure on the pipe joint by means of the hollow body or even to replace the entire pipe portion including the pipe joint.

In addition, provided between the two pipe ends 1 and 2 and the coupling 3 there is also a usual known seal which however cannot be seen in the illustrated example.

That seal on the one hand protects the medium in the pipe from being able to escape outwardly while on the other hand that seal also provides protection from the action of external influences from the outside of the tube in the interior of the tube.

If such pipeworks are designed for a long period, for example some decades, it is not unusual for the seals to suffer damage, for example due to ageing, but in particular also due to external influences. A typical ageing phenomenon in that case is that for example a rubber seal becomes brittle with time and thus also leaks.

That formation of brittleness of the seal has something to do not only with the age of the seal in respect of time, but in particular also involves the fact that the outside atmosphere, that is to say the atmosphere outside the pipe joint, acts on the seal and for example dries it out, degrades it and so forth. That seal ageing process however is also promoted under some circumstances if the pipe is cleaned from the outside, for example with aggressive cleaning agents or with high pressure cleaners or both together. In that case it is not possible to prevent the cleaning fluid then also passing under high pressure to the seal and virtually abrasively wearing it away.

In the structure shown in FIG. 3b the cleaning agent as such, even when it is applied by a high pressure cleaning operation, can no longer reach the coupling itself or its seal because the shrink tube 4, that is to say the deformable hollow body, forms a further mechanical barrier.

Figure 4:
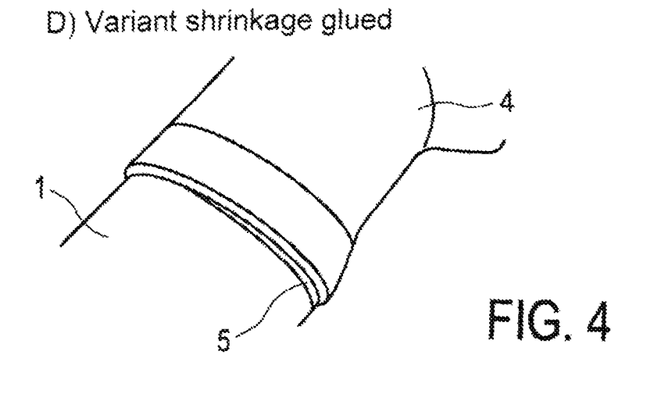
FIG. 4 shows an alternative embodiment of the pipe arrangement with a deformable hollow body placed with a sealing material around a pipe end of the joint.

FIG. 4 shows a further variant according to the invention. In this case, prior to deformation of the hollow body, that is to say for example the shrink tube, an adhesive or another sealing means 5 is fitted around the periphery of the pipe end so that, after deformation of the hollow body, it is additionally sealed off to the pipe end by the sealing means, and under some circumstances may also be fixedly glued in place, which once again impedes or prevents the ingress of substances, compounds and so forth from the exterior in the direction of the pipe joint, pipe coupling and pipe seal.

It is also possible for the sealing means to be in the form of a hot melt adhesive which is applied in the form of a layer or film to the inside of the still non-deformed shrink tube over the full surface or part of the surface thereof. When heat acts on the shrink tube the hot melt adhesive then melts and when the shrink tube is fitted around the pipe ends and the pipe joint and the best possible connection is made between the pipe ends/pipe joint and the shrink tube and then after the shrinkage process the sealing material, adhesive can react, harden or the like in a predetermined fashion. In that way the shrink tube can seal or be adhesively secured fixedly around the pipe ends or pipe joints.

Figure 5:
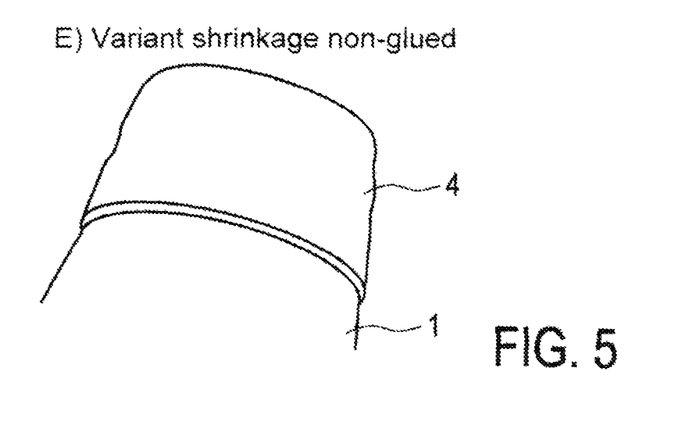
FIG. 5 shows an alternative embodiment of the pipe arrangement with a deformable hollow body placed without a sealing material around the pipe end of the joint.
Figure 6:
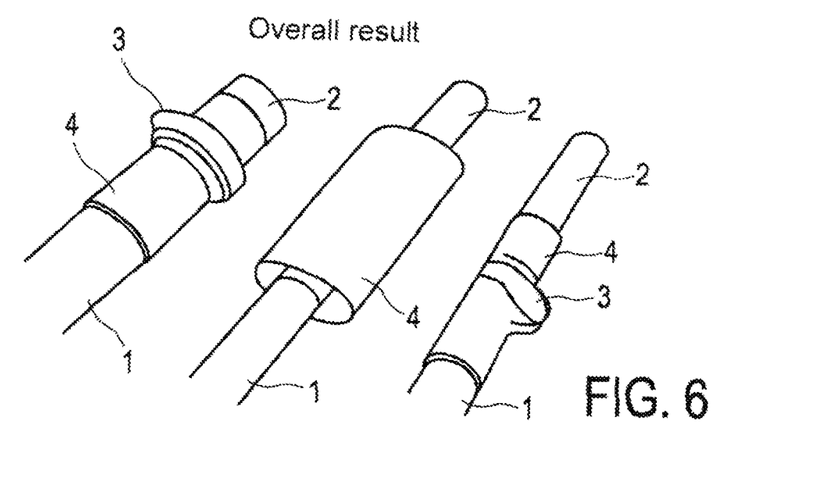
FIG. 6 shows a process of providing the pipe arrangement of FIGS. 3-5.

FIG. 5 shows how the deformable hollow body is placed without a sealing material around the pipe end, in which case, by deformation of the hollow body, particularly when it is a shrink tube which thermally or chemically shrunk, it bears closely and without a gap against the surface of the pipe end and thus represents a highly effective sealing means. If the pipe end is provided from the outside with a paint finish or a surface treatment which is as smooth as possible then the connection by the deformable hollow body can be even better, in particular with better sealing integrity and thus more durably.

Whether ultimately a sealing means, adhesive material or the like is used as shown in FIG. 4, or the deformable hollow body is shrunk without additional sealing means on the pipe ends, depends on the respective factors on site.

By virtue of the fact that according to the invention not only the pipes or pipe ends but in particular also the mechanical joint, that is to say for example pipe shells, pipe couplings, fittings, sleeves or the like are protected, that has the advantage that when those pipes are cleaned those parts are also better protected against the actions of water, aggressive cleaning agents or the like and thus the mechanical connection is also made durable for a longer time and can certainly be produced from more advantageous materials and not as previously stainless steel parts which are very expensive.

The provision of the shapeable hollow body around the pipe joint accordingly provides that the pipe ends, mechanical pipe joint like also the pipe seal are securely protected, which in turn facilitates cleaning from the outside, particularly when that cleaning operation is effected by means of aggressive media and/or by means of high pressure cleaners, for example in kitchens, canteens, hospitals, food production facilities or the like.

When a deformable hollow body is fitted it is also possible, prior to the process of the hollow body, to fit an active or passive moisture sensor, moisture indicator or the like for leakage monitoring so that after deformation of the hollow body it then bears closely against the connecting location of the two pipe ends. In that case the deformable hollow body then also performs the function of fixing the leakage monitoring means so that a lack of sealing integrity of the pipe seal can be reliably monitored or established.

The structure put forward is particularly desirable because in that case it is possible to dispense with additional means for fixing the means for leakage monitoring and ultimately the deformable hollow body also has the advantage that upon leakage of the pipe seal, that is to say when the medium issues outwardly from the pipe interior, the hollow body can prevent the medium from being able to pass to the outside, for example dripping down, and at the same time the leakage monitoring means can measure the leakage and appropriately indicate that in good time.

An alternative configuration which is suitable in particular for retro-fitting to existing pipe joints provides that the existing pipe joint comprising a pipe coupling comprising a single segment or a plurality of segments or a fitting comprising a single segment or a plurality of segments for connecting pipe ends which are smooth-ended and/or provided with a respective thread or provided with at least one respective peripherally extending groove is additionally provided from the outside with a wrapping (sleeve). In that case the wrapping material under some circumstances after the wrapping operation is also thermally deformed and/or self-welded so that it then bears snugly against the pipe joint.

This can involve shrink tube material which is in the form of strip or sleeve material and which is thermally deformed after the wrapping operation or also self-welding or self-vulcanizing silicone strip, rubber strip, sleeve or the like.

In such a case the wrapping like the above-described deformable hollow body also has the described sealing action and once again, as already described, in the wrapping operation, a means for leakage monitoring, that is to say for example a moisture sensor, a moisture indicator or the like, can also be laid in place so that then reliable fixing of the leakage monitoring means is afforded by way of the protection for the pipe joint and its mechanical parts as well as the seal.

If, as proposed according to the invention, the pipe joint is provided with the deformable hollow body and/or the wrapping (sleeve), that can take place in a given period of time, for example in a given year, for example 2017, in a quite specific color, that is to say the wrapping material is black in a given year. If at a later time, for example two years later, the corresponding pipe joint according to the invention is to be renewed, that can be effected by the corresponding color of the material then being changed in the other year, for example 2019, for example then red instead of black.

In that respect it is possible for previously applied material, that is to say the previously applied shrink tube, wrapping and so forth to be previously detached and then replaced by a new one, or a new shrink tube, a new wrapping and so forth is applied over the existing shrink tube or over the already existing wrapping.

By virtue of the appropriate choice of color of the material it is then possible even from a certain distance, for example 5 m or more, to reliably recognize when the pipe joint was provided with the corresponding material so that then the age thereof is also known and it is possible to make appropriate inferences about renewal, maintenance and so forth.

When applying the deformable hollow body, the wrapping, the inserted leakage monitoring means, it is markedly more favorable, like the entire arrangement according to the invention, than previous leakage monitoring means, for example using casing tubes or the like.

The structure according to the invention involving the thermally or chemically deformable hollow body, thus for example the shrink tube, also has the advantage that it can be fitted with usual tools. Ultimately, the applied deformed hollow body also reliably shields the connecting elements of the pipe ends in relation to external environmental influences.

For monitoring the function of the deformed hollow body in relation to ageing, damage and so forth it can also be provided that a pressure sensor is placed in the hollow body prior to deformation, that is to say preferably between the pipe ends or pipe joint on the one hand and the deformable hollow body. When then the hollow body is deformed then the pressure sensor can be used to measure the pressure which the deformable hollow body exerts on the inwardly disposed parts (and vice-versa).

If, because of time ageing, external environmental influences and so forth, the deformed hollow body sometime loses its tightness or function and thus expands then that can be measured and indicated by a drop in pressure.

Insofar as the present application describes that a sealing material, adhesive material and so forth is placed between the deformable hollow body and the pipe ends they can be all known sealing materials, adhesive materials and so forth, which are suitable for such purposes and which in particular have the result that the pipe material on the one hand and also the material of the deformable hollow body are not damaged.

The pipe joint according to the invention and the solution that it provides are particularly suitable for the area of use of pipework systems in water extinguishing installations, for example in sprinkler installations, spray water or extinguishing installations, hydrant installations, extinguishing installations with and without frost protection or foaming agent mix, extinguishing installations in frost-endangered areas and so forth. The use of the invention is also possible in relation to pipe joints and pipes through which for example fluid foods, for example mineral water, milk, beer, sausage meat and so forth are transported.

The hollow body described in the present application, thus for example the shrink tube, in accordance with the invention also has a flame-inhibiting property, is provided with a flame protection in order in that respect also to protect the pipe joint from flames.

The material of the hollow body can also have self-welding or self-vulcanizing properties. This is advantageous in particular when the hollow body is cut up on the basis of length and then the open ends of the hollow body are placed one over the other and they are then to be welded or connected again by vulcanization. That is advantageous in particular upon retro-fitting, that is to say when providing protection for a finished pipe joint if the hollow body which is as yet undeformed cannot be pushed in its closed form over the pipe joint, but only after being cut to length, so that then the open, mutually separated ends can be placed over the pipe joint and joined together.

Figure 7:
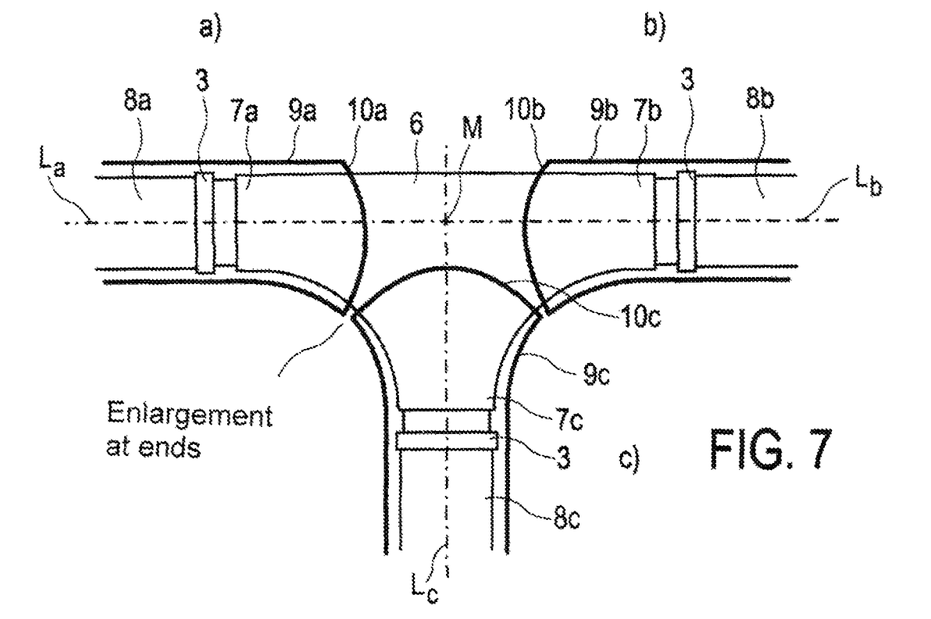
FIG. 7 shows an exemplary embodiment of the pipe arrangement with individual hollow bodies and a T-piece.

FIG. 7 shows a use of the invention for a T-piece 6. That T-piece 6 has three pipe ends 7a, 7b and 7c which are respectively connected with a coupling 3 to respective corresponding further pipe ends 8a, 8b and 8c which are arranged there, so that the couplings result in a firm and also sealed connection of the respective pairs of pipe ends 7a/8a, 7b/8b and 7c/8c. The seals provided in connecting the pipe ends by means of the couplings are provided but not shown in the drawing.

As can be seen from FIG. 7 the hollow bodies 9a, 9b, 9c are placed over the respective pipe end joints and the coupling and when those hollow bodies are in the form of a shrink tube then it is possible by a shrinkage process to produce the closely enclosing cover, bearing in snugly fitting relationship, of the respective coupling and the other pipe portions associated therewith.

As shown in FIG. 7 the individual hollow bodies 9a, 9b and 9c in ends associated with the T-piece are not cut off approximately perpendicularly to their longitudinal axis La, Lb, Lc but have a round portion 10a, 10b, 10c which can also be of an approximately part-circular configuration (as shown in FIG. 7). The advantage of that round portion is that, in the shrinkage process, that part of the hollow body extends as far as possible towards the center point M of the T-piece, but the individual hollow body portions 9a, 9b, 9c can be pushed separately from the respective ends a, b, c on to the T-piece. As the diameter of the T-piece increases towards the center the shrinkage process also provides that the hollow body, that is to say the shrink tube, bears there still more tightly after the shrinkage process than at the parts of the T-piece or the pipe ends 8a, 8b, 8c which are of a smaller diameter.

Figure 8:
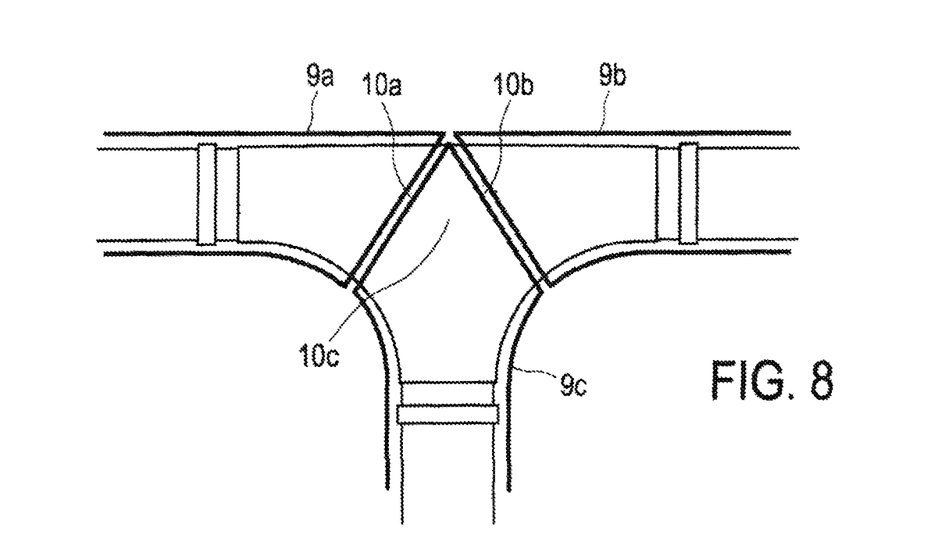
FIG. 8 shows a further exemplary embodiment of the pipe arrangement with individual hollow bodies and a T-piece.

FIG. 8 shows an advantageous variant of a T-piece with hollow body, wherein the front ends 10a, 10b, 10c of the hollow body are correspondingly cut in such a way that, in their front region, that is to say the region which comes to bear over the T-piece, they either exactly contact each other or slightly overlap for example by one or more cm. That however presupposes a special cut of the hollow body portion 9c while the hollow body portions 9a, 9b can involve the same cut configuration.

FIG. 8 only indicates the couplings, for the same applies in that respect as in FIG. 7.

Figure 9:
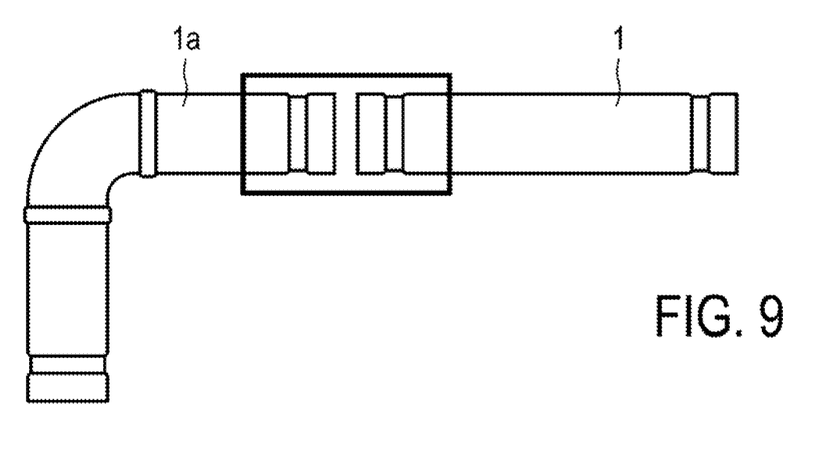
FIG. 9 shows an alternative embodiment of the pipe arrangement with a straight pipe portion coupled to a pipe bend.

FIG. 9 shows the use of the invention on a straight pipe portion 1 coupled to a pipe bend 19. The coupling itself is not shown in FIG. 9, but the same as described with reference to FIGS. 1 through 6 applies at the mutually opposite pipe ends.

Figure 10:
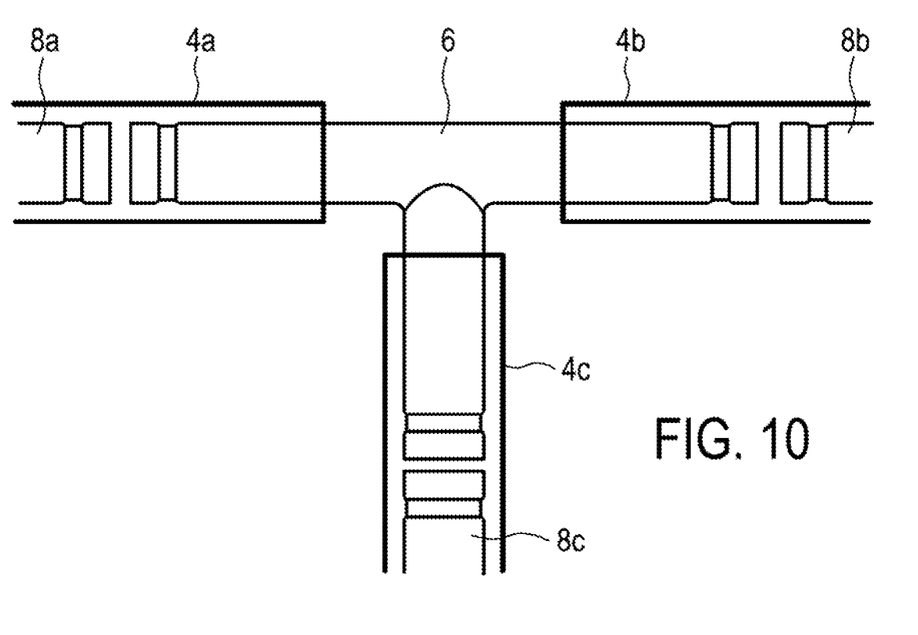
FIG. 10 shows a further alternative embodiment of the pipe arrangement with individual hollow bodies for pipe ends and a T-piece.

FIG. 10 shows a further variant of a T-piece 6 in which once again three hollow bodies 4a, 4b, 4c (of the same shape) fit on the respective ends 8a, 8b, 8c and the coupling joint (not shown) thereof as well as the adjoining pipe ends connected with the coupling. With this kind of T-piece all pipe joints and the hollow bodies are as described with reference to FIGS. 1 through 6.

Figure 11:
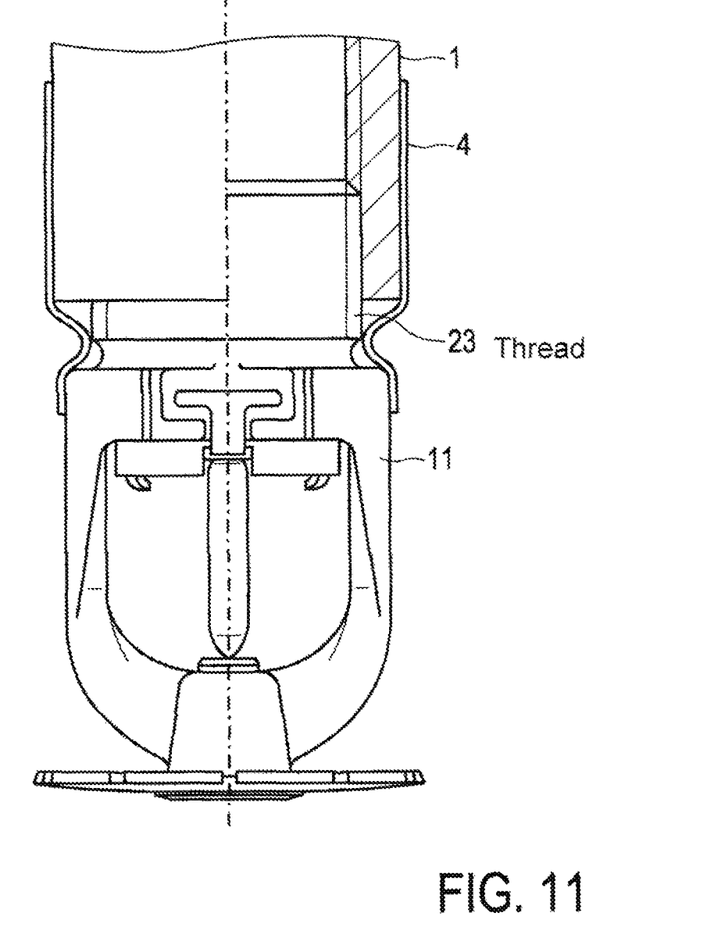
FIG. 11 shows an alternative embodiment of the pipe arrangement with a pipe and a sprinkler outlet.

FIG. 11 shows the use of the invention on a pipe 1 having a sprinkler outlet 11. The sprinkler outlet 11 is usually screwed on to the pipe 1 or fixed thereon in some fashion. In this case the hollow body 4 and its enclosure of the sprinkler outlet as well as the coupling portion of the sprinkler provide that this part of the sprinkler is sealed off in the best possible fashion.

It will also be seen from FIG. 11 that the sprinkler is not screwed with its thread 23 completely into the sprinkler outlet and thus the pipe end 1. By virtue of the arrangement according to the invention of the shrink tube however the entire open part of the thread 23 is covered by the shrink tube and thus a region which hitherto can scarcely be cleaned, by virtue of its many ventings, edges, corners, grooves, etc. is basically kept free of filth and dirt, therefore also dust and cleaning residues, which overall improves use of the sprinkler, in particular its usability.

Figure 12A:
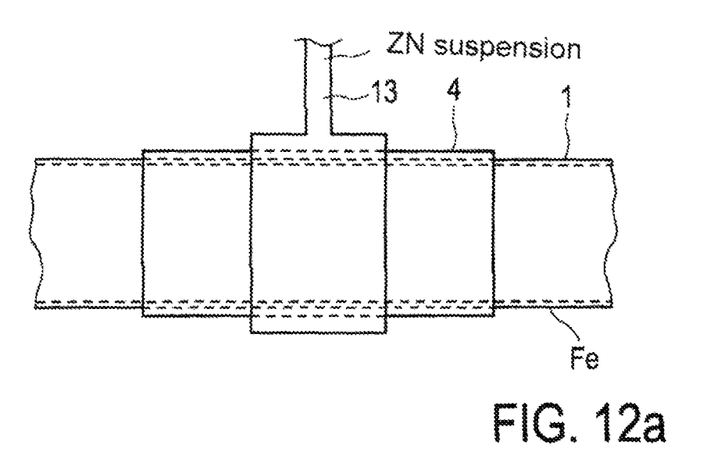
FIGS. 12a and 12b shows an alternative embodiment of the pipe arrangement with a suspension of a pipe.
Figure 12B:
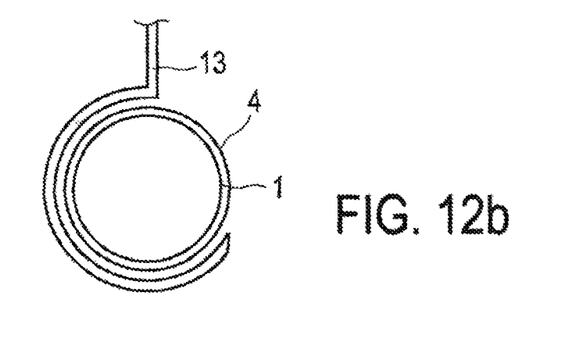

FIGS. 12a and 12b show the use of the invention on a suspension 13 of a pipe 1. As can be seen from FIG. 12a the pipe 1 is enclosed at a given location by the hollow body, for example the shrink tube, and it is precisely there that the suspension 13 also embraces the pipe. That structure is particularly appropriate where the pipe comprises a different material, for example iron, stainless steel, from the material of the suspension, for example zinc, tin and so forth. Accordingly this use also provides that there is material insulation between the various materials involved and thus there is no chemical-physical reaction between the material of the suspension on the one hand and the pipe on the other hand, with the consequence that both the suspension and also the pipe do not suffer degradation and thus remain more long-lived. The suspension shown in FIG. 12b of the pipe 1, in which the arrangement of the suspension 13 does not directly contact the pipe, but only by way of the hollow body arranged therebetween, that is to say the shrink tube, also avoids any scratches and so forth occurring on the tube and thus damaging same, in the event of movement by virtue of shaking of the building. With the invention therefore the forces which emanate from the suspension upon shaking of the building would act on the hollow body material and as this involves consumable material, later easier repair is possible and desirable at any time.

The use of the hollow body in that case has the advantage that this structure is very simple and in particular, by virtue of shrinkage of the hollow body, the insulating material is fixedly connected to the pipe and cannot be unintentionally displaced.

Figure 13:
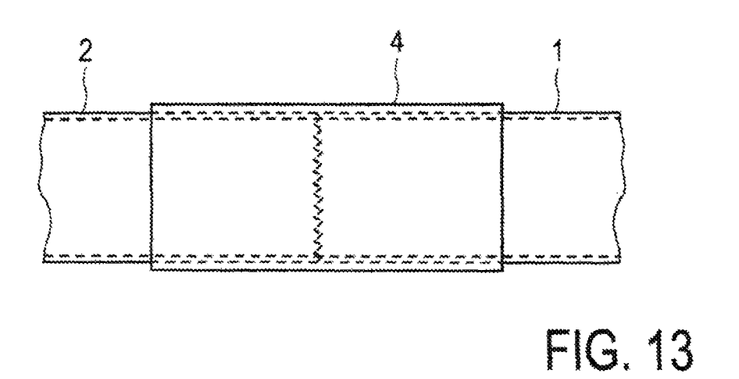
FIG. 13 shows an alternative embodiment of the pipe arrangement with pipe ends connected in a positively locking relationship.

FIG. 13 shows the use of the invention on pipe ends which are connected together not by a coupling but in positively locking relationship, for example by a welding process, a soldering process or the like.

When two pipe ends 1 and 2 are welded or soldered together or the like the result is usually a weld seam, solder seam and so forth. As shown in FIG. 13 the hollow body now provides that the weld seam, solder seam or the like is protected from the outside environment and thus no corrosion can occur there or it can suffer no damage due to spraying of water thereon at that location of the weld seam, solder seam or the like, or suffer a loss of quality in some fashion.

Figure 14:
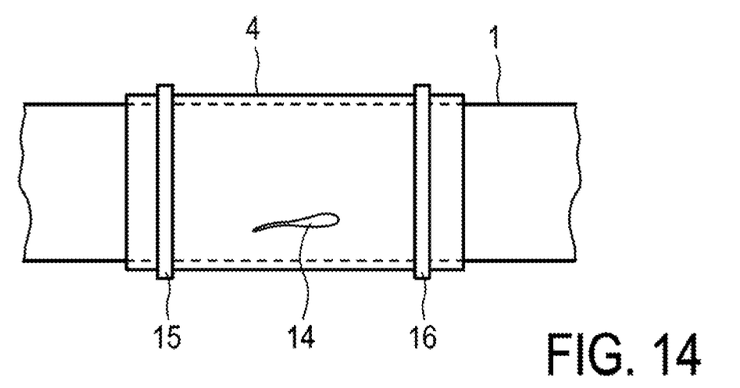
FIG. 14 shows an alternative embodiment of the pipe arrangement with a pipe with a leak.

FIG. 14 shows the use of the invention on a pipe 1 which has a leak, that is to say an opening 14. Such a leak is undesirable for the medium in the pipe 1 can escape outwardly through that leak.

The leak is at least temporarily sealed off by means of the hollow body 4. The sealing action can also be improved by further aids, for example the adhesive already described above at the inside of the hollow body, but also by applying rings 15 and 16 at both sides of the leak to the shrink tube from the outside. The rings 15, 16 can also be cable ties which are tightened or metal rings which are applied around the shrink tube and are then fixedly tightened on the pipe until the tube is then squashed in between the metal ring and the pipe.

Sealing off a pipe opening, that is to say a pipe leak, by means of the shrink tube may be unusual and possibly this is also not a satisfactory long-term solution. It will be noted however that the advantage of the structure according to the invention is that firstly a sealing action is provided at all and then, when for example the pipe is part of a fire protection installation, for example a sprinkler installation in a production facility, further production is still possible without the medium in the pipe being able to escape into the production facility. In most cases even in larger production operations there are given rest periods, for example at night, at weekends or in vacation shut-downs and then a regular seal can be applied to the leak, but beforehand the solution according to the invention is a simple and inexpensive option for sealing off the leak.

Figure 15:
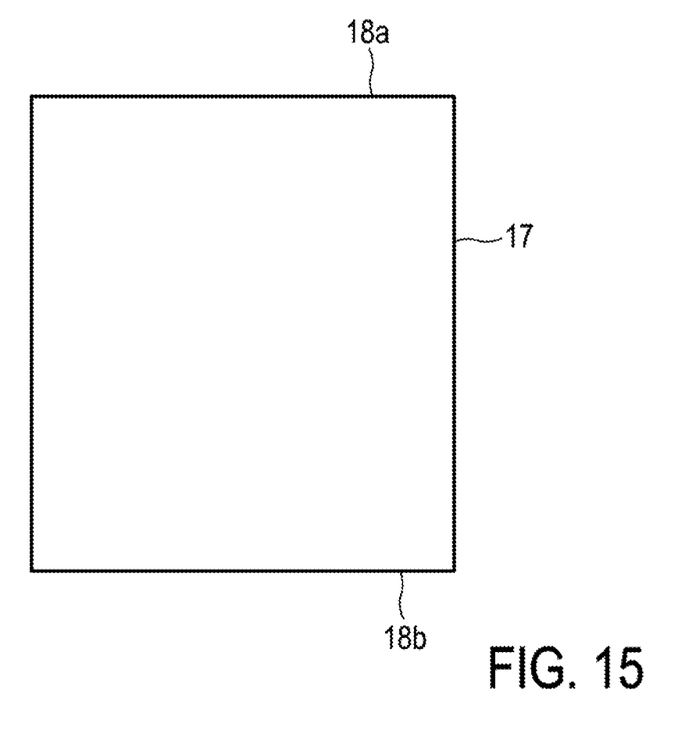
FIG. 15 shows an alternative form of a hollow body for an embodiment of the pipe arrangement.

If as in the situation shown in FIG. 14 however it is not possible in other situations to fit the hollow body shaped to form a tube over the pipe it is also possible for the hollow body first to be provided on the pipe itself. For that purpose—as already described—for example the hollow body material as shown in FIG. 15 can initially be in the form of a for example rectangular cuff or sleeve 17 which is then placed or wrapped around the pipe joint or the pipe. So that the sleeve remains fitted around the pipe ends or the pipe joints or the pipe the oppositely disposed ends 18a and 18b of the sleeve are then placed around the pipe ends, pipe joints or pipes in such a way that they possibly overlap once or a plurality of times and then pipe ends are then fixed. That can be implemented by means of sealing rail which for example can be removed again after the shrinkage process and cooling of the sleeve, but it is also possible for the respective ends 18a and 18b of the sleeve 17 to be designed in the manner of a zip fastener and joined together like a zip fastener. It is also possible if at least one end 18a and/or 18b is provided with an adhesive such that the ends which are placed one over the other of the sleeve remain joined together by the adhesive and thus the shrinkage process can be carried out without the sleeve ends 18a and 18b becoming detached from each other in that case.

Figure 16:
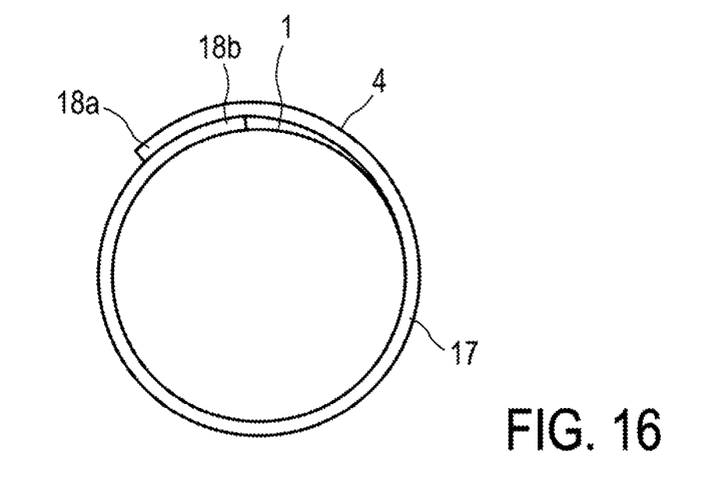
FIG. 16 shows an alternate embodiment of the pipe arrangement with a hollow body with overlapping ends.

FIG. 16 shows the configuration of the pipe 1 which is surrounded by a hollow body 4 which is initially in the form of a sleeve 17. As can be seen, the ends 18a and 18b of the sleeve 17 overlap and when an adhesive is applied at least to the inside of the sleeve end 18a it adheres to the outside of the sleeve end 18b and thus fixes the sleeve and accordingly allows the shrinkage process without in that case the sleeve coming loose again.

Preferably for ease of use however the entire inside of the sleeve 17 is wetted with a suitable adhesive so that when the sleeve is fitted to form the hollow body it is not relevant which end is up and which end is down.

In addition therefore the adhesive provides for best possible fixing of the surrounding sleeve on the pipe 1.

Figure 17:
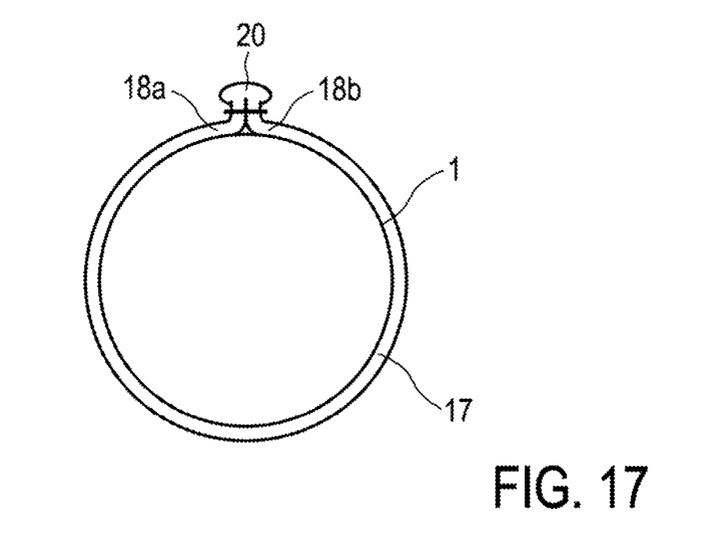
FIG. 17 shows an alternate embodiment of the pipe arrangement with a hollow body having ends connected with a sealing rail.

FIG. 17 shows a variant of the provision of the hollow body around the pipe by means of a sleeve, in which the two sleeve ends 18a and 18b are (fixedly) connected together with a sealing rail 20. That sealing rail can but does not necessarily have to be removed after the shrinkage process.

Insofar as the present application provides for the use of an adhesive at the inside of the hollow body of the sleeve this should involve an adhesive suitable for the use of a shrink tube. In that respect for example a suitable adhesive is one which is available under the name Hot Melting Adhesive HS-TR-067 from Hongshang Heat Shrinkable Materials Co., Ltd, Shenzhen, China. The adhesive material in that case does not have to be arranged over the full surface area but can also be on part of the surface area on the inside of the hollow body. More specifically it is to be considered in that respect that, during the shrinkage process, the material contracts, and care is to be taken to ensure that there is not too much adhesive material put between the hollow body (shrink tube) and the pipe ends, coupling or pipe, and thus no "adhesive bubbles" are formed on the inside of the hollow body. The above-mentioned "hot melt adhesive" from Hongshang is a suitable material, many other adhesive materials can also be used and are correspondingly suitable in the same way.

As already described use of the invention is suitable in particular where sprinkler installations and their pipes, pipe systems are installed for example in buildings or industrial premises in which cleaning frequently has to be implemented using aggressive media and/or high pressure cleaners. Besides the above-mentioned kitchens, canteens and hospitals these can also be industrial premises for food production, for example cheese factories, sausage factories, slaughterhouses, milk-processing organizations, drinks manufacturers, slaughterhouses, meat cutting business and so forth, all production organizations in which it is a mandatory requirement that the entire production facility is cleaned at recurring intervals, for example once a day, once a week and so forth in accordance with strict hygiene requirements.

In such industrial premises the water-carrying pipe arrangements, pipes, pipe ends, sprinklers and their outlets and so forth of fire extinguishing installations are mounted both to the side walls and also under the ceiling and cleaning of the area within the production facilities usually includes not only cleaning of the machines and floors in the production facility (for example tiles) but also cleaning of the entire room area including all wall and ceiling regions. The consequence of this is that the pipe arrangements, pipes, pipe ends and thus coupling regions of the pipe ends and also the sprinklers are cleaned recurrently, for example with high pressure cleaners, using a strong jet of water from the cleaner, and the configuration of the hollow body for example in the form of a shrink tube around the pipe arrangements, pipe ends, couplings, pipes, sprinkler outlets and so forth not only protects regions (covered) protected by the hollow body from the strong jet of water, but on the pipe arrangements, pipe ends, coupling and so forth the undercut configurations or surfaces which can scarcely be cleaned are "smoothed" by the hollow body material so that easier cleaning is possible or there are fewer deposit locations for the accumulation of germs, microorganisms and so forth.

It is also possible for the shrink tube material to be enriched with nanosilver or the like so that in that way, at those locations where the hollow body is formed with the induced nanosilver, microorganisms, germs and so forth can even less settle there.

For monitoring whether under some circumstances in a cleaning process by means of a chemical cleaner or better by means of a high pressure cleaner means the cleaner passes from the outside into the region between the hollow body and the tube or the tube joint it is also possible to provide there a leakage monitoring means, for example a moisture sensor 21 or the like. That moisture sensor is then connected wirelessly or by means of a line 22 to an alarm center in which the signals of the leakage monitoring means are assessed and, in the situation where a relevant amount of moisture is between a hollow body and a pipe or pipe joint, that can be indicated in order therewith to maintain the existing arrangement.

As stated the invention describes a pipe arrangement comprising a pipe joint or a single pipe, in which accordingly the part of the pipe arrangement, that is enclosed by the hollow body and thus covered, is protected from environmental influences to the best possible extent, but also from the influence of cleaning materials and cleaning processes.

The environmental influences in that respect are in particular air humidity, possible aggressive materials and media which are contained in the air, also incident light, cleaning materials, chemicals, and also any form of gas but also water which acts on the pipe arrangement by way of a cleaning device, for example also high pressure cleaners.

The invention claimed is:

1. A pipe arrangement comprising a protective device for protecting against environmental influences, the pipe arrangement comprising:
   a pipe joint which has at least two pipe ends which are fixed together by a mechanical joint and in which the pipe ends and also the mechanical joint are enclosed with a deformable hollow body and the hollow body after assuming its definitive deformation bears snugly against the pipe ends and the mechanical joint and surrounds same in positively locking relationship,
   wherein the mechanical joint comprises a coupling having a plurality of segments joined together by screws,
   wherein a rubber seal is disposed between the at least two pipe ends and the plurality of segments of the coupling,
   wherein the deformable hollow body, after assuming its definitive deformation, completely encloses the at least two pipe ends and the mechanical joint,
   wherein a moisture sensor is disposed between one of the at least two pipe ends and the mechanical joint, and
   wherein the deformable hollow body, after assuming its definitive deformation, also completely encloses the moisture sensor.

2. A pipe arrangement as set forth in claim 1 wherein the deformable hollow body is deformable by a thermal treatment or is chemically deformable and the deformable hollow body comprises a shrink tube.

3. A pipe arrangement as set forth in claim 1 wherein the pipe ends are smooth-ended or which are respectively provided with a thread or which are respectively provided with at least one peripheral groove.

4. A pipe arrangement as set forth in claim 1 wherein the pipe arrangement has a T-piece which includes three pipe ends.

5. A pipe arrangement as set forth in claim 1 wherein the hollow body has a sealing function and contains a sealing mass or material.

6. A pipe arrangement as set forth in claim 1 wherein the hollow body has flame-inhibiting properties.

7. A pipe arrangement as set forth in claim 1 wherein the pipe or the pipe joint is additionally provided with a wrapping which has at least one or more of the following properties:
   a) the wrapping is thermally deformable or chemically deformable and shrinks upon deformation,
   b) the wrapping has self-welding or self-vulcanizing properties,
   c) the wrapping includes an additional sealing substance,
   d) the wrapping has flame-inhibiting properties, and
   e) the wrapping is provided with an adhesive.

8. A pipe arrangement as set forth in claim 1 wherein the hollow body is provided at least at one side with an adhesive which is provided over a full surface area or part of the surface area of the hollow body.

9. A pipe arrangement as set forth in claim 1 wherein the hollow body comprises a sleeve around the pipe or the pipe joint.

* * * * *